United States Patent [19]
Sutterlin et al.

[11] Patent Number: 5,461,629
[45] Date of Patent: Oct. 24, 1995

[54] ERROR CORRECTION IN A SPREAD SPECTRUM TRANSCEIVER

[75] Inventors: Philip H. Sutterlin, San Jose; Amy O. Hurlbut, San Francisco, both of Calif.

[73] Assignee: Echelon Corporation, Palo Alto, Calif.

[21] Appl. No.: 942,723

[22] Filed: Sep. 9, 1992

[51] Int. Cl.⁶ .......................... H03M 13/00; H04B 1/69; H04B 3/54
[52] U.S. Cl. .......................... 371/30; 371/49.1; 375/200
[58] Field of Search .................... 371/37.1, 30, 49.1; 375/1

[56] References Cited

U.S. PATENT DOCUMENTS

| | | | |
|---|---|---|---|
| 4,517,679 | 5/1985 | Clark et al. | 375/37 |
| 4,641,322 | 2/1987 | Hasegawa | 375/1 |
| 4,748,636 | 5/1988 | Kato | 375/1 |
| 4,809,296 | 2/1989 | Braun et al. | 375/1 |
| 4,864,589 | 9/1989 | Endo | 375/1 |
| 4,866,733 | 9/1989 | Morishita | 375/1 |
| 4,879,713 | 11/1989 | Ichiyoshi | 370/75 |
| 4,905,221 | 2/1990 | Ichiyoshi | 370/18 |
| 4,918,690 | 4/1990 | Markkula, Jr. et al. | 370/94 |
| 4,918,707 | 4/1990 | Yoshihara | 375/1 |
| 4,979,183 | 12/1990 | Cowart | 375/1 |
| 5,010,554 | 4/1991 | Bechtel et al. | 371/37.1 |
| 5,090,024 | 2/1992 | Vander Mey et al. | 375/1 |
| 5,278,862 | 1/1994 | Vander Mey | 375/1 |

OTHER PUBLICATIONS

Sundberg, C., "A Class of Soft–Decision Error Detectors for the Gaussian Channel", *IEEE Trans. on Communications*, Jan. 1976, pp. 106–111.

Haykin, S., *Digital Communications*, pub. by John Wiley & Sons, 1988, pp. 84–95, 273–322, 445–471.

*Primary Examiner*—Stephen M. Baker
*Attorney, Agent, or Firm*—Blakely, Sokoloff, Taylor & Zafman

[57] ABSTRACT

An improved transceiver for power line communication using a spread spectrum signal. The amount of correlation for each bit in a word is determined. If a parity error occurs, the state of the bit with the weakest correlation is changed.

2 Claims, 5 Drawing Sheets

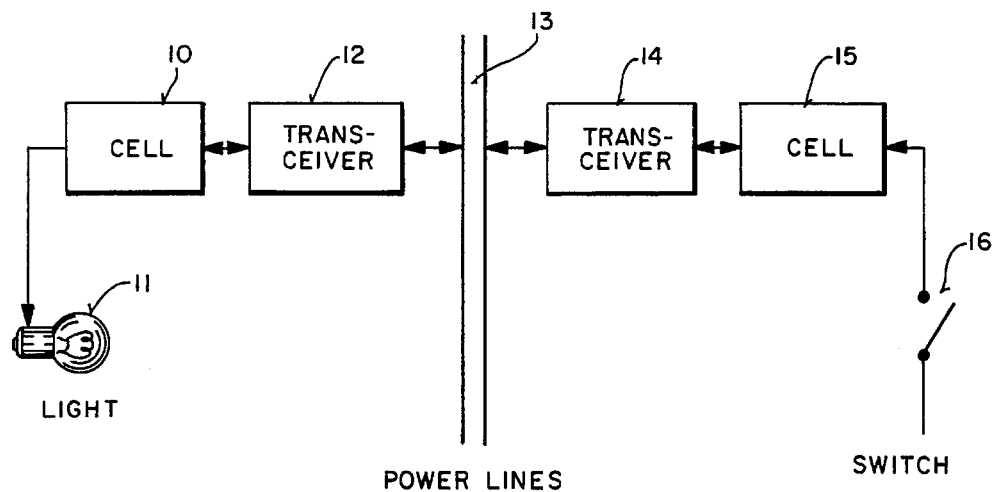
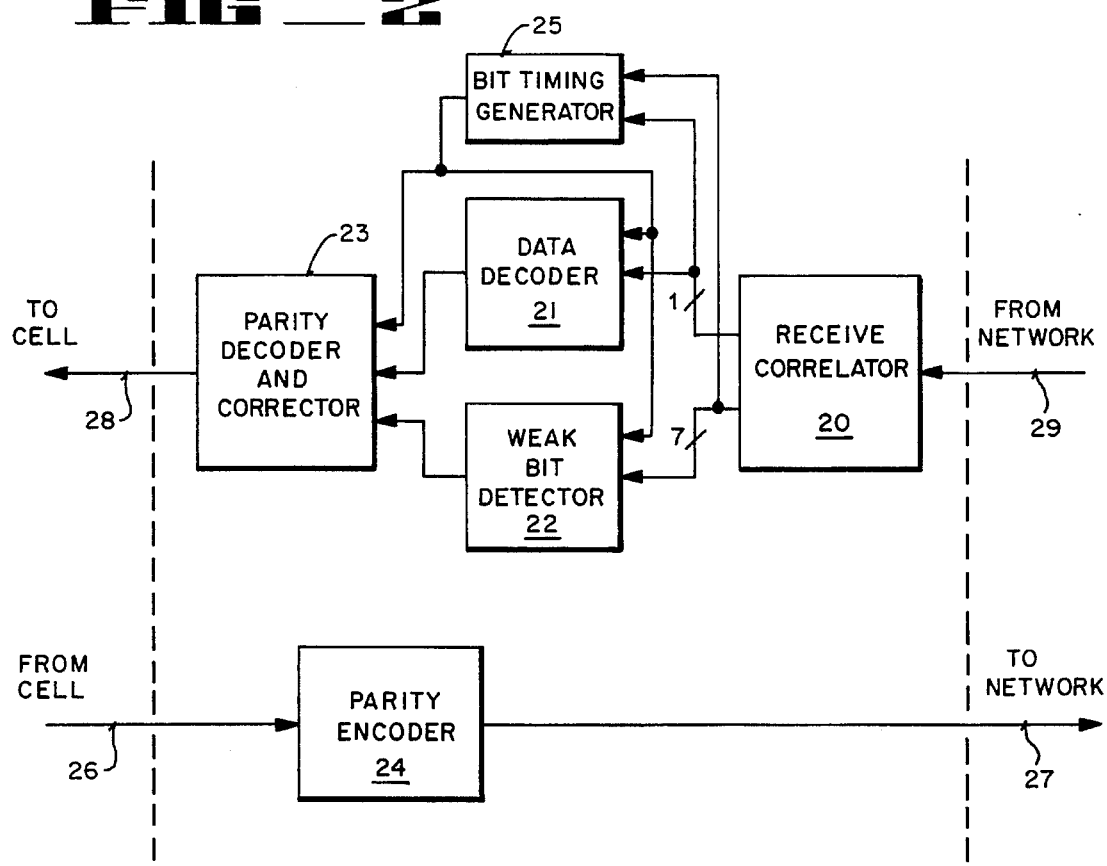

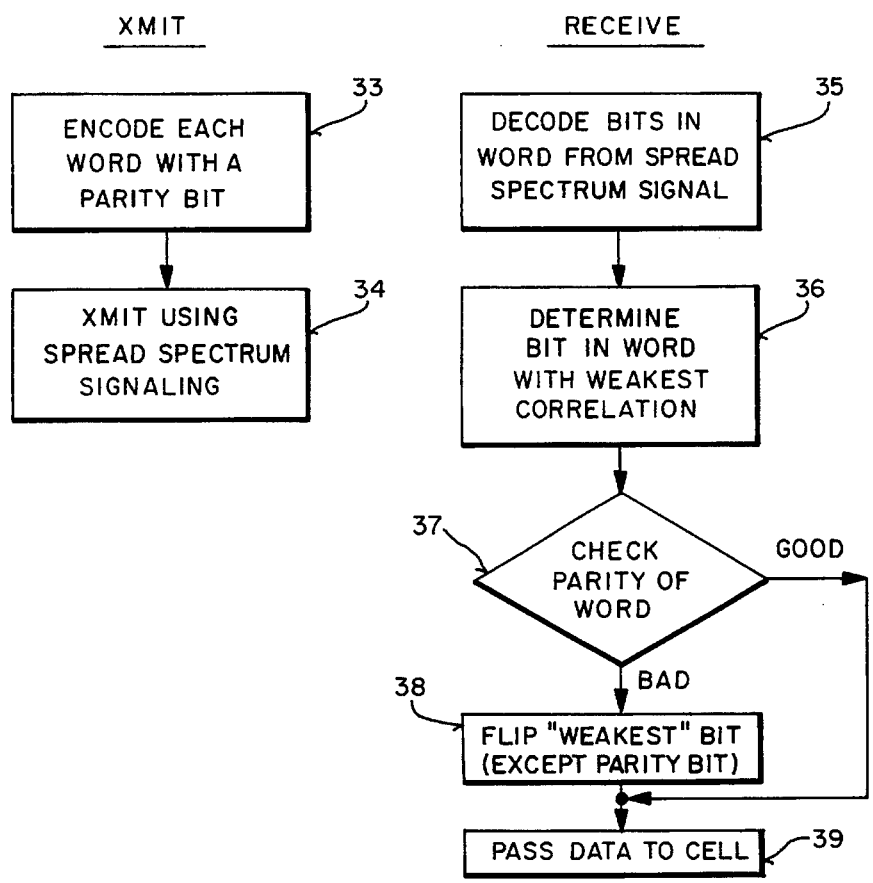
FIG_3
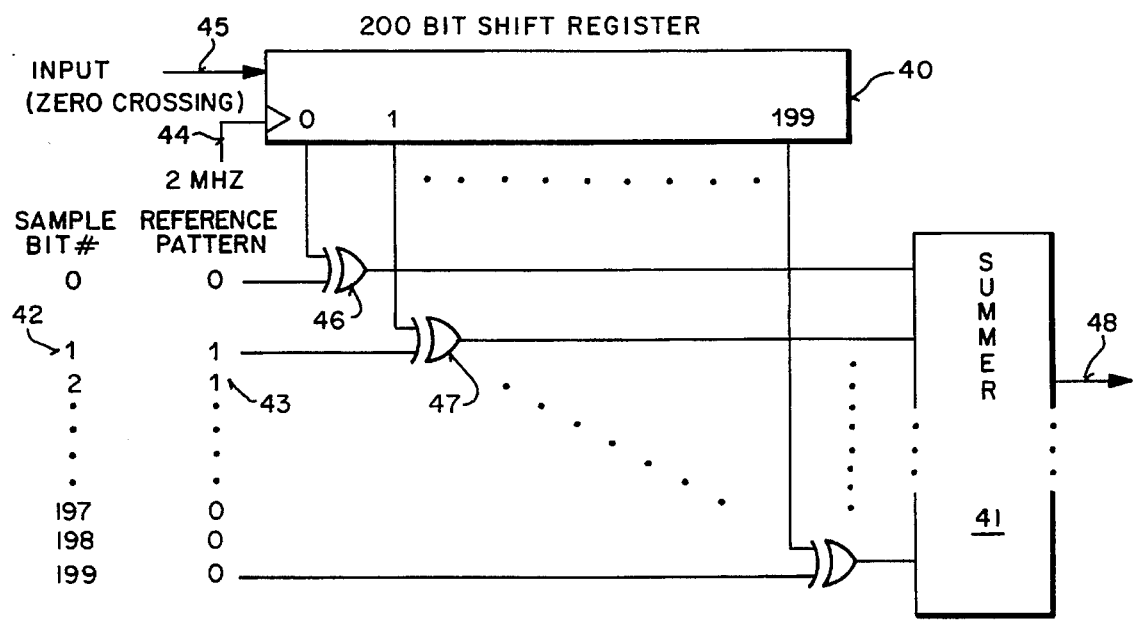
FIG_4

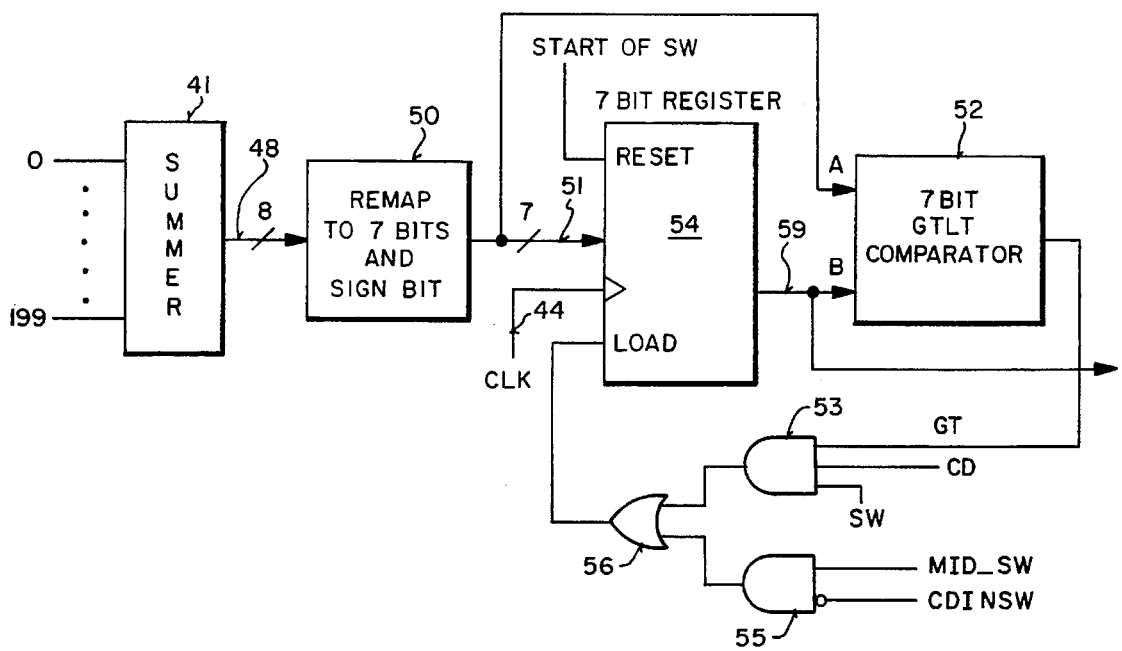
FIG_5
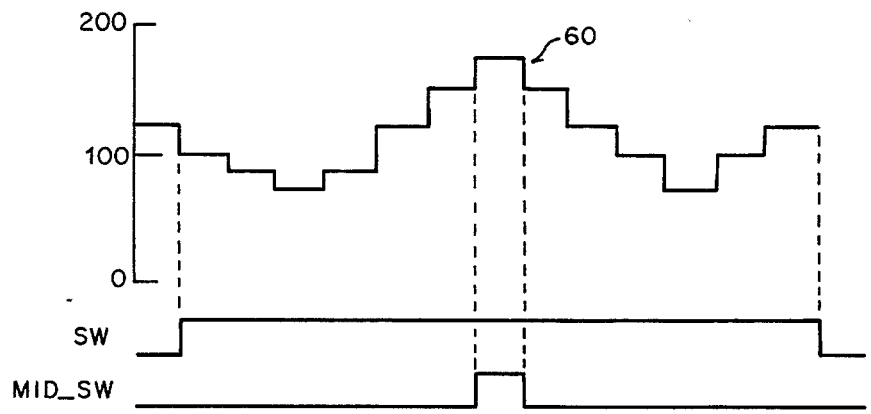
FIG_6
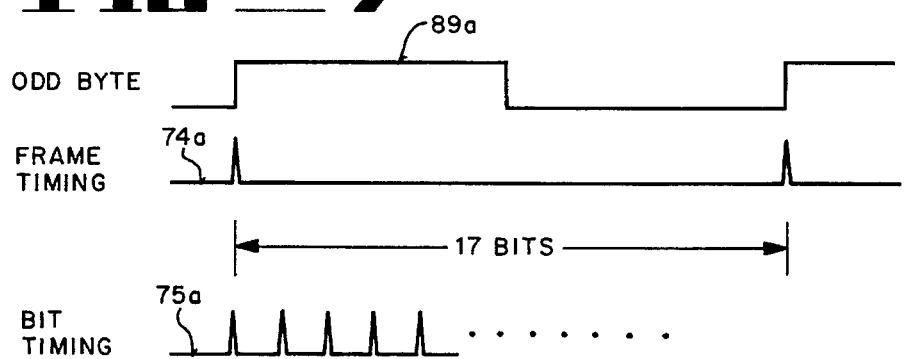
FIG_7

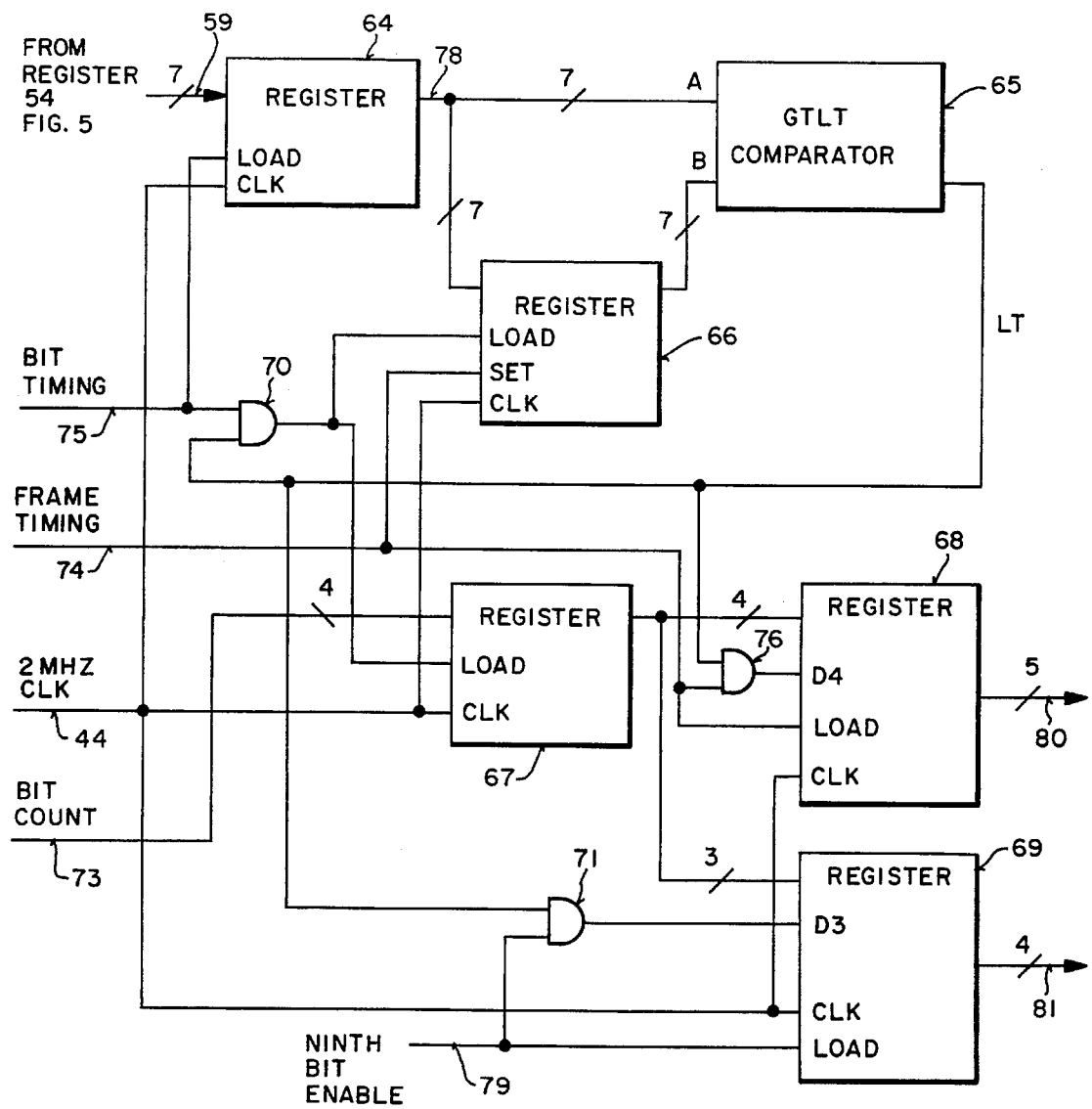

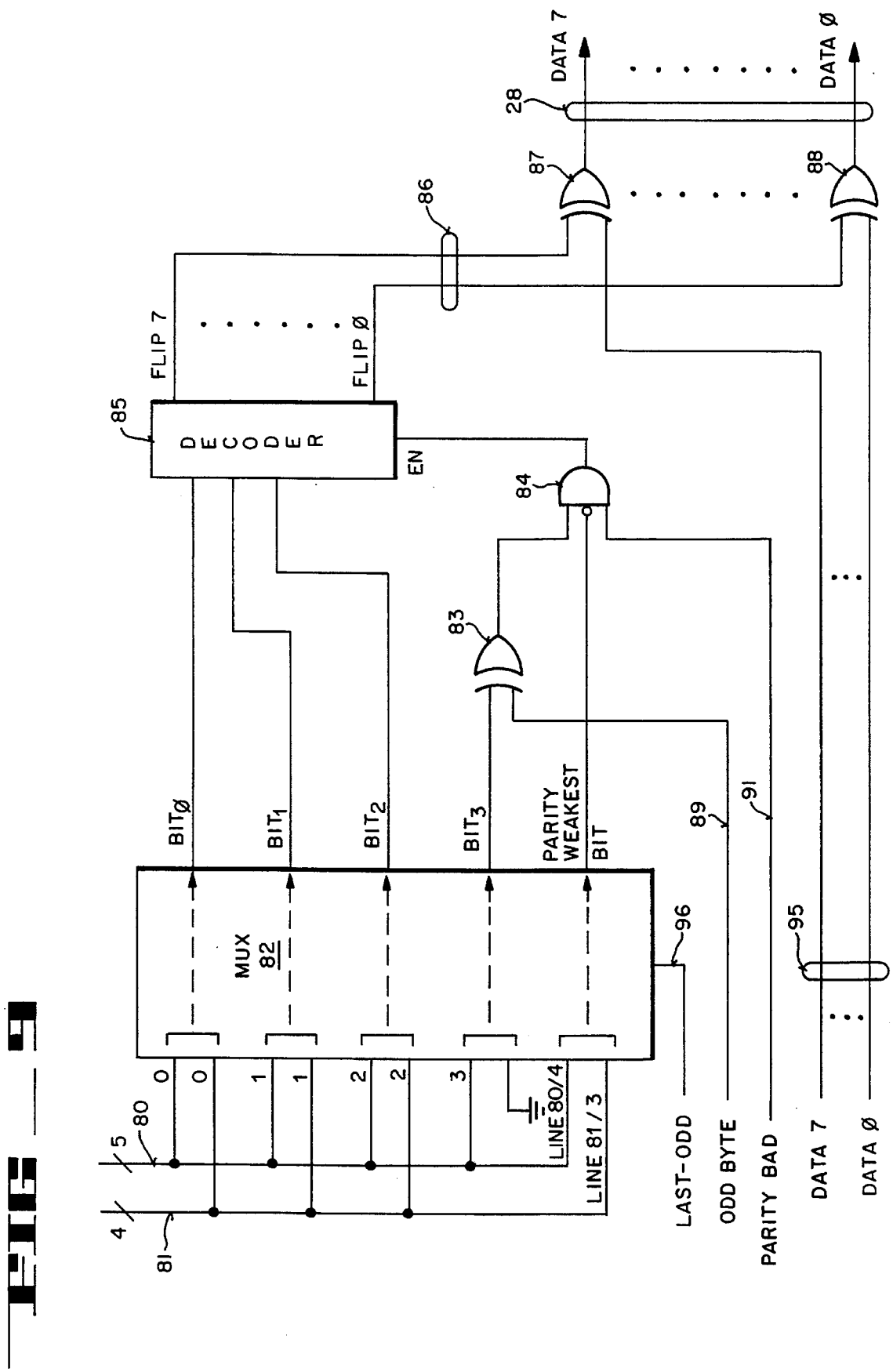

ERROR CORRECTION IN A SPREAD SPECTRUM TRANSCEIVER

BACKGROUND OF THE INVENTION

1. Field of the Invention

The invention relates to the field of spread spectrum communications and, more particularly, to error detection and correction of digital data in such communications.

2. Prior Art

U.S. Pat. No. 4,918,690 describes the use of plurality of cells in a network which senses, communicates and controls. In a typical application a change in a light switch state is sensed by one cell, this change in state is communicated to a second cell over power lines, and a light is controlled by the second cell in response to the change in state of the switch. The cells typically interface with a network (e.g., power lines) through transceivers. U.S. Pat. No. 4,979,183 describes a transceiver which uses a spread spectrum signal for use in such a network. Other patents describing spread spectrum communications particularly for power line communications are U.S. Pat. Nos. 4,864,589; 4,641,322; 4,918,707 and 5,090,024. Other spread spectrum communication links are described in U.S. Pat. Nos. 4,866,733; 4,905,221; 4,748,636 and 4,879,713.

The present invention is directed towards the detection and correction of errors in connection with data communicated by a spread spectrum signal. Error correcting codes are well-known in the art, such as a Hamming code. As will be seen, the present invention permits the detection and correction of errors with substantially less overhead than do standard error correcting codes. The present invention makes use of a "hint" derived from the condition of the signal as discussed in the Detailed Description of the Invention.

SUMMARY OF THE INVENTION

A method and apparatus are disclosed for correcting errors in a digital word communicated by use of a spread spectrum signal. In the currently preferred embodiment, each word is transmitted with a parity bit. The received spread spectrum signal is correlated with an ideal expected receive pattern which resembles the waveform used to transmit each bit of the word. The data bits in the word are detected from this correlated signal. The bit with the weakest correlation is identified. If an error is present in the word as determined by a parity check, the state of the bit associated with the weakest correlation is changed. If the parity bit is found to have the weakest correlation, no change to the bits in the word is made.

Other aspects of the present invention will be seen from the following Detailed Description of the Invention.

BRIEF DESCRIPTION OF THE DRAWINGS

FIG. 1 is a block diagram illustrating the environment in which a transceiver built in accordance with the present invention is used.

FIG. 2 is a block diagram illustrating the apparatus of the present invention.

FIG. 3 illustrates a series of steps showing the method of the present invention.

FIG. 4 is an electrical schematic and block diagram illustrating the receive correlator portion of the apparatus of the present invention.

FIG. 5 is a block diagram illustrating the portion of the apparatus of the present invention used to determine a correlation value for each bit in a word.

FIG. 6 is a graph showing typical correlation of a data bit versus time.

FIG. 7 illustrates a plurality of waveforms used to explain the operation of the apparatus of the present invention.

FIG. 8 is a block diagram of the portion of the apparatus of the present invention which determines the position of the bit in a word having the weakest correlation.

FIG. 9 is a block diagram of the portion of the apparatus of the present invention which changes the state of the bit having the weakest correlation if a parity error exists.

DETAILED DESCRIPTION OF THE PRESENT INVENTION

A method and apparatus is described for correcting an error in a digital word where the word is transmitted using a spread spectrum signal. In the following description numerous specific details are set forth, such as the specific number of bits, specific timing, etc., in order to provide a thorough understanding of the present invention. It will be obvious to one skilled in the art that the present invention may be practiced without these details. In other instances, well-known circuits have been shown in block diagram form in order not to obscure the present invention in detail.

In application Ser. No. 698,602, now U.S. Pat. No. 5,195,098, filed May 10, 1991 and entitled "Binary Data Error Correction Using Hint Signal" and assigned to the Assignee of the present invention, the general concept of employing a "hint" signal to correct errors in digital words is described. The present application is directed toward using this concept in spread spectrum communications.

ENVIRONMENT IN WHICH THE PRESENT INVENTION IS USED

In FIG. 1, cells 10 and 15 are shown which may be the cells disclosed in U.S. Pat. No. 4,918,690. Cell 15, by way of example, may sense the state of switch 16. A change in switch state causes cell 15 to broadcast a data packet over the power lines 13. A transceiver 14 provides an interface between the cell 15 and the power line 13. On the receiving end, another transceiver 12 provides an interface between the power line 13 and the cell 10. For the illustrated example, the cell 10 may control the light 11. Consequently, on command of the switch 16 the light 11 may be operated through a communications link (the power line 13). Transceivers 12 and 14 permit messages to be sent in both directions since even for the example shown, the cell 10 may acknowledge the receipt of a message from the cell 15.

With the present invention, the transceivers 12 and 14 transmit signals over the power line 13 with a spread spectrum signal. More particularly, the present invention is directed towards the detection and correction of errors in the received digital data, especially errors caused by noise on the power line 13.

FORMATTING OF THE PACKETS IN THE CURRENTLY PREFERRED EMBODIMENT OF THE PRESENT INVENTION

In the currently preferred embodiment of the present invention data packets are used to communicate between the cells; these packets are n bytes long where n can be either an odd or even integer. A packet of, for example, 10 bytes may be communicated from the cell 15 to the transceiver 14. In the currently preferred embodiment, the transceiver 14 generates one parity bit for every two bytes in the packet. Thus, for the 10 byte packet, five parity bits are generated, one for each 16 bit word. The parity bits are transmitted along with the data packet to the transceiver 12. Transceiver 12 uses the parity bits in accordance with the present invention to detect and in conjunction with a "hint" to correct errors in the packet. (The hint is determined by selecting the bit with the weakest correlation.) The parity bits are stripped from the packet before the packet's data is communicated to the cell. Thus, continuing the example of a ten byte packet, ten bytes without the parity bits are transmitted from the transceiver 12 to the cell 10. If the packet transmitted by cell 15 is an odd number of bytes, say seven, then a parity bit is used after the first, second and third 16 bit words and a separate parity bit is used for the last byte. Again, when this packet is received by the transceiver 12, the parity bits are used to detect and correct errors, however, the parity bits are not passed on to the cell 10. The data packet sent from the cell 15 to the cell 10 may include other checking mechanisms, such as a cyclic redundancy code which allow the cells to verify the accuracy of the packets. This level of coding is transparent to the transceivers just as the parity bits placed within the packets by the transceivers are transparent to the cells. As will be seen, the fact that parity bits are used for every two byte word except when there are an odd number of bytes in a packet, somewhat complicates the currently preferred embodiment of the present invention. It will be obvious, however, to one skilled in the art that the present invention may be used with, for example, one parity bit per byte or with other error detection codes for detecting errors. In this regard there are various choices which allow trading off transmission overhead, error density capability and hardware complexity. For instance, at one extreme, a single parity bit may be used per packet. This results in relatively little increase in transmission overhead but increases hardware since the entire packet must be stored for analysis. On the other hand, using a parity bit per byte requires more transmission overhead but lessens the hardware needed when compared to one parity bit per packet. In the currently preferred embodiment (one parity bit per two bytes) there is an approximately 6% increase in transmission overhead.

OVERVIEW OF THE PRESENT INVENTION

Certain aspects of the transceiver described below are disclosed in applications Ser. No. 942,580, filed Sep. 9, 1992, now U.S. Pat. No. 5,289,498, entitled "Adaptive Data Recovery for Spread Spectrum Systems" (hereinafter referred to as the "Data Recovery Application") and Ser. No. 942,646, filed Sep. 9, 1992 now U.S. Pat. No. 5,263,050, entitled "Adaptive, Threshold in a Spread Spectrum Communications System", (hereinafter referred to as the "Threshold Application") both assigned to the assignee of the present invention.

Referring first to FIG. 2 when a transceiver receives data from a cell for transmission over a network, it encodes the data with parity bits as shown by the parity bit encoder 24 of FIG. 2. As mentioned above, one parity bit is used for each two bytes in a packet except for packets with odd number of bytes where an additional parity bit is used for the last byte. A parity bit is placed after each 16 bit word and a final parity bit after the last byte for packets with an odd number of bytes. The data is then transmitted as shown by line 27. Ordinary well-known circuitry may be used for encoding the parity bits into the packets. In FIG. 3 the transmission of data from a transceiver is shown by blocks 33 and 34. As shown by step 33, each word as described above is encoded with a parity bit and then the packet is transmitted using a spread spectrum signal as shown by step 34. In the currently preferred embodiment, each bit is transmitted using a predetermined waveform (or its inverse) as discussed in the Data Recovery Application.

When a packet is received, it is coupled to the receive correlator 20 as shown by line 29. Here, the bits of the packet are decoded from the spread spectrum signal using a correlator as discussed in detail in the Data Recovery Application. Correlator 20 is shown in FIG. 4 and also includes the summer 41 and circuit 50 of FIG. 5.

The bit timing generator 25 establishes and maintains synchronization on received packets, and provides bit timing signals to other blocks in the receive path. The data decoder 21 decodes the data (and parity) bits. The weak bit detector 22 identifies the bit in each word which has the weakest correlation. The parity decoder and corrector 23 uses this information to change the state of the weakest bit if the parity for the word is bad. As mentioned, the packet is then sent to the cell, as shown by line 28, without the parity bits. Specific circuits for implementing FIG. 2 as used in the currently preferred embodiment are subsequently described.

The method implemented in the present invention is shown in FIG. 3 under the heading "RECEIVE". Step 35 shows the decoding of bits in a word from the spread spectrum signal. Step 36 shows that the bit in each word with the weakest correlation is determined. Also, a parity check is done on each word as shown by step 37. If the parity for the word is bad, the bit with the weakest correlation is flipped, that is, its state is changed as shown by step 38. Then the word is passed to the cell as shown by step 39. On the other hand, if the parity is good, the word is passed to the cell without correction. The present invention operates on the assumption that if there is a parity error in a word, most likely it is the bit with the weakest correlation which was incorrectly decoded. As will be discussed later, if the bit with the weakest correlation is the parity bit, then no correction is made to a word.

CURRENTLY PREFERRED EMBODIMENT OF THE PRESENT INVENTION

The input signal from the network is first passed through a band pass filter to provide a signal in the range of approximately 100K–450 KHz. This is the band in which the spread spectrum signal is transmitted. The zero crossings of these signals are detected by an ordinary circuit and coupled by line 45 of FIG. 4 to a 200 bit shift register 40. As shown by line 44, the shift register is clockerd at 2 MHz. Consequently, the input signal on line 45 is sampled at the 2 MHz rate (approximately 4 times the highest frequency component in the band limited spread spectrum signal). The shift register 40 continually shifts in all signals detected on line 45.

Each bit is transmitted, as mentioned, using a predetermined waveform for one binary state and the inverse of the waveform for the other binary state. The waveform is a pattern (e.g., a carrier modulated by a pseudo random pattern) which when transmitted provides a spread spectrum signal. A predetermined and expected receive pattern (or reference pattern) resides in the receive correlator. Since the particular pattern employed is not critical to the present invention, a full pattern 43 is not shown in FIG. 4.

As the sampling occurs at the input of register 40, either a binary one or a binary zero is shifted into the register depending upon whether the signal in the band of interest has been detected to be above or below the midpoint. It takes 100 microseconds for a signal sampled on line 45 to travel from one end of the shift register to the other. This 100 microseconds is equal to a data bit time.

For one embodiment, each stage of the register is coupled to an exclusive OR gate such as OR gates 46 and 47 shown coupled to the stages numbered zero and one of the shift register. The other terminal of each of the gates receives one bit of the reference pattern 43. The output of the exclusive OR gates are summed in a summer 41. The output of each gate is treated as a least significant bit by the summer. The summer output (an 8 bit binary signal) represents the amount of correlation between the data in the register 40 and the reference pattern 43. The continually shifting contents of the register 40 are continuously correlated with the reference pattern 43.

While in FIG. 4 exclusive OR gates are shown for purposes of explanation, in the currently preferred embodiment they are not used. Rather, each stage of the register 40 has a true output and its complement. The reference pattern 43 is in effect duplicated by the selection of the true output or its complement for each stage. Thus, the outputs from the register can be directly coupled to the summer 41.

The summer 41 provides the 8 bit output word on lines 48. If all zeros are applied to the summer 41 from the gates, then the binary word on lines 48 represents the number 0; this in practice, is a perfect correlation for one of the binary data states. On the other hand, if all the XOR gates have high outputs, then the binary signal on lines 48 represents the number 200 (decimal), a perfect correlation for the other binary state. In practice, perfect correlations are seldom achieved. The Data Recovery Application describes in detail how data is recovered from non-ideal correlation outputs. For the purpose of distinguishing valid data signals from noise a threshold is used as discussed in the Threshold Application. Assuming the threshold is currently set to 45%, a correlation is considered to break threshold when the output from the summer 48 is between 0 and 45 or is between 155 and 200. Once a correlation breaks threshold a synchronization (sync) window can be established since the bit time period is known. The occurance of a threshold break is indicated by a carrier detect (CD) signal. The CD signal is high when a current correlation value exceeds the current threshold level (otherwise it is low). For purposes of the present invention, the particular threshold and the manner in which the sync window is generated and used are not critical.

Referring to FIG. 5, the summer 41 is again shown with its 200 input lines and its 8 bit output on lines 48.

In the currently preferred embodiment, the 8 bit output on lines 48 is remapped to 7 bits and a sign bit by circuit 50. This circuit subtracts the decimal number 100 from the binary number on lines 48 in two's complement arithmetic and then takes the absolute value of this remainder. The most significant bit of the remainder is the sign bit and the other bits the absolute value. Ordinary well-known circuits are used to implement this function.

The absolute value (seven bits) from circuit 50 is coupled to a seven bit register 54 over lines 51. The lines 51 are also coupled to the A terminal of a seven bit greater than/less than (GTLT) comparator 52. The B terminal of the comparator 52 is coupled to receive the contents of the register 54 on lines 59. The register 54 is clocked at the 2 MHz rate as indicated by line 44. The register 54 is loaded when the output of OR gate 56 is high. This occurs when the output of the AND gate 53 is high as will be described or when the output of AND gate 55 is high. One input terminal of the gate 53 receives the sync window (SW) signal which is shown in FIG. 6, another terminal receives the carrier detection (CD) signal and the last terminal is coupled to the output of comparator 52. The CD signal goes high when a correlation breaks threshold. One input to gate 55 is the mid-sync window signal (see FIG. 6) and the other is the carrier detection in the sync window (CDINSW) signal which is coupled to an inverting terminal of the gate 55. At the start of each sync window, the register 54 is reset to all zeros.

Before understanding the operation of the circuit of FIG. 5, it will be helpful to understand the sync window signal which is shown in FIG. 6. As mentioned, once a carrier detection occurs as defined by the threshold discussed above, a sync window is established. This sync window in the currently preferred embodiment is 13 samples wide (of the 2 MHz clock). The sync window signals are periodic (every 100 microseconds). As shown in FIG. 6, correlation for a bit generally has a center lobe 60 with side lobes preceding and following the center lobe. (Distortion may cause a side lobe to be larger than a center lobe, see Data Recovery Application.) The sync window, once generated, is used to prevent spurious correlations which fall outside the window from being detected as bits. The sync window (SW) signal is used in FIG. 5 and elsewhere.

The circuit of FIG. 5 determines the "best" correlation value for each data bit. The "best" correlation value for a data bit is determined considering specific correlation values within the sync window (in combination with the carrier detect signal) as will be described below. At the beginning of a sync window the register 54 is reset to 0. As values appear at the output of circuit 50, for example those associated with a side lobe, they are coupled to the GTLT comparator 52. If the value of the signal on lines 51 (terminal A) is greater than that at terminal B (output of register 54) a high signal is applied to the gate 53 from the comparator 52. This signal is passed through the gate 53 if the SW signal and CD signal are active causing the register 54 to load the value on lines 51 into the register under control of the clock signal. Each time during the sync window that the correlation breaks threshold and the value of the signal on lines 51 is greater than the value stored in the register 54, the register 54 is updated with a new value. Therefore, at the end of the sync window the register 54 will store the highest value from lines 51 if it exceeds the threshold. This stored value, which is considered the best correlation value for a particular data bit, is either the highest correlation for that data bit, or the value on line 51 during the middle sample the sync window if no correlation exceeds threshold during the sync window. This is then repeated for each data bit.

The register 54 is loaded if: the value on lines 51 is greater than the value stored in register 54, sync window is active and the current value on lines 51 exceeds a predetermined threshold for carrier detection. If no correlation during the sync window breaks threshold, register 54 will contain the absolute value of the correlation during the middle sample of the sync window. (MID-SW is active during the middle sample of SW; CDINSW is low if no correlation has broken threshold yet during the SW.) This condition is included because if no correlation breaks threshold, it is assumed that the bit has been distorted and the most reliable sample to record as the correlation value is the middle sample of the current sync window.

Referring to FIG. 8, a register 64 receives the output of register 54 of FIG. 5 on lines 59. The register 64 is loaded for each new data bit by a bit timing signal from line 75. The waveform for this signal is shown in FIG. 7 as waveform 75*a*; it is high for one 2 MHz clock cycle every bit time. The register 64 is clocked by the 2 MHz clocking signal. The outputs of register 64, lines 78, are coupled to the A terminal of a GTLT comparator 65 and a register 66. The output of the register 66 is coupled to the B terminal of the comparator 65. The LT (less than) output from the comparator 65 provides one input to an AND gate 70. The bit timing signal from line 75 provides the other input. The output of this AND gate is the load signal for the registers 66 and 67. Both these registers are clocked by the 2 MHz clocking signal on line 44. The register 66 is set to all ones under control of a frame timing signal on line 74. The waveform for this signal is shown as waveform 74*a* of FIG. 7 and is high for one 2 MHz clock cycle every frame, at the beginning of each word. A frame is equal to 17 bit times for a 16 data bit word.

The register 67 receives a bit count signal on lines 73. This signal is a four bit binary signal which counts from 0 to 15 for the first 16 bits of each frame with the count increasing for each bit period. The count restarts at the beginning of each frame. As will be seen, the count in this register along with the output of comparator 65 identifies the bit within a word with the weakest correlation. The register 67 is loaded with the current bit count from lines 73 each time a weaker correlation is sensed by the comparator 65. The output of the register 67 is coupled to a register 68 and to a register 69. Only three bits (least significant bits) from register 67 are coupled to the register 69. Again as will be seen, the register 69 stores the bit position for the weakest bit for the last nine bits (eight data bits plus one parity bit) in a packet where a packet has an odd number of bytes. Register 68 stores the bit position of the bit with the weakest correlation for the 17 bits (16 data bits plus one parity bit). For this reason, register 68 is loaded for each frame by the signal of line 74.

The D4 (most significant bit) loaded into the register 68 is from the output of the gate 76. This gate provides a high output signal when the LT output of the comparator 65 is coincident with the frame timing signal on line 74. This occurs when the parity bit of a 16 bit word has the weakest correlation. Note that the count on lines 73 which is selectively stored in register 67 is only 4 bits and consequently, counts only 0 to 15. Similarly, the D3 bit of the register 69 is set high if the ninth bit has the weakest correlation. This bit is provided by the AND gate 71 which receives the LT output of comparator 65 as one of its inputs and the signal on line 79. The signal on line 79 is high during the ninth bit of each word. The content of register 69 is used only for the last byte of a packet when there are an odd number of bytes in a packet since a parity bit is used for the last byte.

In operation, the circuit of FIG. 8 receives the seven bits on lines 59 which, at the times when register 64 is loaded, indicate the best correlation for each bit. This is loaded into the register 64 for each bit time and then compared with the contents of register 66. At the beginning of each word, the signal on line 74 sets the contents of register 66 to all ones. When the correlation value for the first bit is coupled onto line 78, it is compared with all ones contained within the register 66. In practice, the A input will be less than the B input for this condition and the output of gate 70 under control of the bit timing signal will cause the value on lines 78 to be loaded into register 66. As the best correlation value for each bit on lines 59 is shifted into register 64, it is continually compared with the contents of register 66. This results in register 66 storing the correlation value of the data bit with the lowest (weakest) correlation for each word.

Each time the register 66 is loaded, the output of gate 70 causes the bit count on line 73 to be loaded into register 67. Thus, the register 67 contains the position of the data bit with the weakest correlation; that is for example, a count of 1100 in register 67 indicates that the twelfth bit has the weakest correlation. The contents of register 67 are loaded into register 68 (4 bits) for each frame (i.e., for each word) and the three least significant bits from register 67 are similarly loaded into register 69 after nine bits of a word to be used for the last byte of a packet containing an odd number of bytes. This is caused by a signal on line 79. As mentioned, D4 is set high in register 68 when the parity bit is the weakest bit and similarly D3 of register 69 is set high when the parity bit is the weakest bit for the odd byte case.

The circuit of FIG. 9 changes the state of the bit with the weakest correlation in the event the parity for a word is bad. The circuit of FIG. 9 is somewhat complicated by the fact that in the currently preferred embodiment the data is handled byte-by-byte and a single parity bit is used for two byte words except for the last byte when an odd number of bytes are used.

The multiplexer 82 receives 5 bits from the register 68 of FIG. 8 on lines 80, and 4 bits from the register 69 on lines 81. The multiplexer 82 selects lines 80 or lines 81. The lines 81 are selected by the signal on line 96, which is high when the byte on lines 95 is the last byte in a packet having an odd number of bytes. Otherwise the lines 80 are selected. The bits 0, 1 and 2 from the multiplexer 82 are decoded by the 3 to 8 decoder 85 and the eight lines 86 are coupled to eight exclusive OR gates, two of which are shown, gates 87 and 88. The decoder 85 selects one of the eight lines at its output when enabled thereby selecting the appropriate bit for correcting. The decoder is enabled when the output of gate 84 is high. If the output of this gate is low, all outputs of the decoder are low and the data is passed from lines 95 to lines 28 without any change.

As mentioned, an active high signal is required from gate 84 before correction of data occurs. One input to gate 84 is a signal on line 91 which indicates that the parity for the word is bad. Ordinary circuit means are used to check the parity of the word. Therefore, for the decoder 85 to be enabled, the parity for the word must be bad.

Another input to the gate 84 is the signal from either line 80/4 or line 81/3. This signal indicates that the parity bit is the weakest bit. In this case, data correction would be inappropriate even if the parity for the word is bad. The "parity weakest" signal is coupled to an inverting terminal of gate 84 and therefore blocks data correcting when this signal is active high.

The last signal coupled to the input of gate 84 is the output of the exclusive OR gate 83. One input to this OR gate is the signal on line 89, this signal is high for all odd bytes. (See waveform 89*a* of FIG. 7). The other input to gate 83 is the third bit from lines 80 or a low input if lines 81 are selected. To understand the function of these signals, first consider the case of a 16 bit word. During the first byte of this word, a high signal is present on line 89. If bit 3 is low, the weakest bit is in the first byte. For these conditions, gate 83 provides a high output to gate 84 enabling decoding and correction if the other conditions for gate 84 are satisfied. On the other hand if during the first byte of the word, bit 3 is high, this would indicate that the weakest bit is in the second byte of the word. The output of gate 83 now would be low, disabling the decoder 85 so that no correction takes place for that byte. However, when the odd byte signal on line 89 drops, (at this time the second byte of the word is present on lines 95) the conditions of gate 83 are satisfied and correction can occur in the second byte of the word. For the case when lines 81 are selected, the signal on line 89 will be high since the last byte is an odd byte and bit 3 will be low since multiplexer 79 has selected a ground terminal for bit 3. Now gate 83 provides a high output to gate 84 enabling correction of the last byte if correction is needed.

As previously mentioned, lines 28 provide the selectively corrected data which is coupled to the cell.

It may occur that two or more of the correlation values which exceed threshold during a single bit time are equal, and are the highest value. In this case the GTLT comparator 52 of FIG. 5 does not provide a high output for second or subsequent equal values. Similarly, it may occur that two or more data bits in a word have equally low best correlation values. In this case, comparator 65 does not provide an output for the second or subsequent equal lowest value. Consequently, the first "weakest" bit for the word is the one that is changed, if there is a parity error.

The above described method and apparatus has been found to be particularly useful in reducing the effects of dimmer noise in a power line communications link. Dimmer noise can be particularly difficult to deal with since the spikes occur periodically (e.g., every 8 milliseconds) and these periodic spikes can destroy data in every packet. The present invention has been found to provide a substantial improvement against dimmer noise and substantial improvement against other periodic sources of noise in a power lines communication link. This improvement is achieved without the high overhead associated with prior art error correcting codes.

We claim:

1. An apparatus for correcting an error in a digital word, where the digital word and a parity bit for the word are transmitted using a spread spectrum signal comprising:

a shift register for correlating the spread spectrum signal with a predetermined waveform;

register means for receiving the maximum correlation value for each bit in the word coupled to the shift register;

comparator means coupled to the register means for identifying a lowest maximum correlation value for the bits in the digital word from the maximum correlation values for each bit received by the register means;

error detection mean for detecting a parity error in the digital word;

bit position determining means for determining the position in the digital word of the bit having the lowest maximum correlation value, coupled to the comparator means; and, bit changing means coupled to said error detection means and said bit position deterning means for selectively changing the state of the bit corresponding to the lowest maximum correlation value.

2. The apparatus defined by claim 1 wherein said register means includes a greater than comparator means for comparing correlation values and for identifying correlation values which are greater than other correlation values for each bit.

* * * * *

UNITED STATES PATENT AND TRADEMARK OFFICE
CERTIFICATE OF CORRECTION

PATENT NO.    :   5,461,629
DATED         :   October 24, 1995
INVENTOR(S)   :   Sutterlin et al.

It is certified that error appears in the above-identified patent and that said Letters Patent is hereby corrected as shown below:

In column 4 at line 51 delete "clockerd" and insert --clocked--

Signed and Sealed this

Thirtieth Day of September, 1997

Attest:

BRUCE LEHMAN

Attesting Officer    Commissioner of Patents and Trademarks